United States Patent
Kudoh

(10) Patent No.: US 6,876,847 B2
(45) Date of Patent: Apr. 5, 2005

(54) CONTROL OF SYNCHRONOUS DISPLAY OF MELODY INFORMATION AND DIFFERENT INFORMATION ON MOBILE COMMUNICATION TERMINAL

(75) Inventor: Kazuhiro Kudoh, Tokyo (JP)

(73) Assignee: NEC Corporation, Tokyo (JP)

(*) Notice: Subject to any disclaimer, the term of this patent is extended or adjusted under 35 U.S.C. 154(b) by 487 days.

(21) Appl. No.: 09/967,958

(22) Filed: Oct. 2, 2001

(65) Prior Publication Data

US 2002/0045440 A1 Apr. 18, 2002

(30) Foreign Application Priority Data

Oct. 4, 2000 (JP) .................................. 2000-304295

(51) Int. Cl.$^7$ ................................................ H01S 4/00
(52) U.S. Cl. ................................... 455/403; 455/414.1
(58) Field of Search ............................ 455/403, 414.1

(56) References Cited

U.S. PATENT DOCUMENTS

| | | | | |
|---|---|---|---|---|
| 5,739,759 A | * | 4/1998 | Nakazawa et al. | 340/825.44 |
| 6,078,005 A | | 6/2000 | Kurakake et al. | |
| 6,255,937 B1 | * | 7/2001 | Hamaguchi | 340/384.7 |
| 2001/0023197 A1 | * | 9/2001 | Shibata | 455/567 |
| 2003/0114150 A1 | * | 6/2003 | Hayashi | 455/418 |

FOREIGN PATENT DOCUMENTS

| | | |
|---|---|---|
| GB | 2 371 720 | 7/2002 |
| JP | 2600162 | 1/1997 |
| JP | 10-136064 | 5/1998 |
| JP | 10-295932 | 10/1998 |
| JP | 11-112615 | 4/1999 |
| JP | 2000-157727 | 6/2000 |
| JP | 2000-210473 | 8/2000 |
| JP | 2000-233079 | 8/2000 |
| JP | 2001320447 | 11/2001 |

OTHER PUBLICATIONS

European Search report dated Aug. 4, 2003.

* cited by examiner

*Primary Examiner*—Creighton Smith
(74) *Attorney, Agent, or Firm*—Whitham, Curtis & Christofferson, P.C.

(57) ABSTRACT

A mobile communication terminal has a melody sound source for simultaneously producing the sounds of a plurality of sound parts of melody data, a vibrator for vibrating a casing in response to a preset action, and a light-emitting diode for emitting light in response to a preset action. A melody timing output circuit in the melody sound source outputs a signal that determines the sounds of a given part of the melody data to a controller. The controller has analyzed the melody data of the given part, and determined, in advance, contents to be displayed, and performs a display control process in response to the signal output from the melody timing output circuit.

8 Claims, 9 Drawing Sheets

FIG. 6

| MUSIC TITLE, THE NUMBER OF PARTS, OTHER HEADER INFORMTION |
|---|
| TONE INFORMATION OF THE FIRST PART |
| SOUND INTENSITY INFORMATION OF THE FIRST PART |
| • • • |
| TONE INFORMATION OF THE Nth PART |
| SOUND INTENSITY INFORMATION OF THE Nth PART |
| SOUND GENERATION CONTROL (START) TIME(TIMING), SOUND PART OF THE FIRST SOUND |
| TONE INFORMATION OF THE ABOVE SOUND |
| SOUND LENGTH INFORMATION OF THE ABOVE SOUND |
| • • • |
| SOUND GENERATION CONTROL (START) TIME(TIMING), SOUND PART OF THE Mth SOUND |
| TONE INFORMATION OF THE ABOVE SOUND |
| SOUND LENGTH INFORMATION OF THE ABOVE SOUND |
| DATA END INFORMATION |

CONTROL OF SYNCHRONOUS DISPLAY OF MELODY INFORMATION AND DIFFERENT INFORMATION ON MOBILE COMMUNICATION TERMINAL

BACKGROUND OF THE INVENTION

1. Field of the Invention

The present invention relates to a mobile communication terminal, and more particularly to a mobile communication terminal having a melody playing means for simultaneously producing the sounds of a plurality of sound parts of melody data, a vibrator for vibrating a casing of the mobile communication terminal in response to a preset action, and a light-emitting diode for emitting light in response to a preset action.

2. Description of the Related Art

Heretofore, it is the general practice for mobile communication terminals to produce a sound corresponding to a pressed key or play one of various melodies or actuate an equipped vibrator upon the arrival of an incoming call. There are many mobile communication terminals which control an output device in synchronism with a melody For actually playing a melody, since a sound source is controlled by melody data, the timing to actually produce the sound has to be determined by a signal which is synchronous with a signal that directly controls the sound source.

It is theoretically possible for the conventional mobile communication terminal to analyze melody data according to a software-implemented process and display data in synchronism with the melody as it is played. Actually, however, since the controlling of the sound source depends on the software-implemented process, it is difficult to achieve strict synchronization between the display of data at the timing that is recognized by the software-implemented process and the melody that is actually played, from the start to end of the performance of the melody.

SUMMARY OF THE INVENTION

It is therefore an object of the present invention to provide a mobile communication terminal of the type intially defined which is capable of obtaining display information different from melody information in synchronism with the melody based on the melody information.

According to a first aspect of the present invention, a mobile communication terminal comprises output means for generating and outputting a timing signal to produce sounds of a given part of the melody data, and control means for performing a display control process in synchronism with the timing signal from the output means and performing a display control process on information unrelated to note information or sound length information accompanying the sounds of the melody data in association with the note information or the sound length information.

According to a second aspect of the present invention, a mobile communication terminal comprises output means for generating and outputting a signal to actuate the vibrator according to a given part of the melody data, and control means for performing a display control process in synchronism with the signal to drive the vibrator from the output means and performing a display control process on information unrelated to note information or sound length information accompanying the sounds of the melody data in association with the note information or the sound length information.

In order to control the display of data in synchronism with melody sounds, it has heretofore been customary to obtain a display control timing signal from melody data. According to the present invention, separate different information is associated with the note information or sound length information of the melody data and displayed in synchronism with the melody data. It is thus possible to obtain display information different from the melody data in synchronism with the melody using the conventional melody data capable of generating the sounds of a plurality of parts.

Since the contents to be displayed are unrelated to the melody data, the sounds of the melody data are not in accord with the contents to be displayed. According to an embodiment of the present invention, the intensity of the sounds of the given part is eliminated to prevent the sounds of that part from being produced.

With the display information associated with the sound source control information, display information contained in melody data can be processed in strict synchronism with the sound source, and the melody data is associated with the display information to allow a melody data format to be used as it is in performing the above function.

The above and other objects, features, and advantages of the present invention will become apparent from the following description with reference to the accompanying drawings which illustrate examples of the present invention.

BRIEF DESCRIPTION OF THE DRAWINGS

FIG. 6 is a diagram showing a melody data format;

DESCRIPTION OF THE PREFERRED EMBODIMENTS

Figure 1:
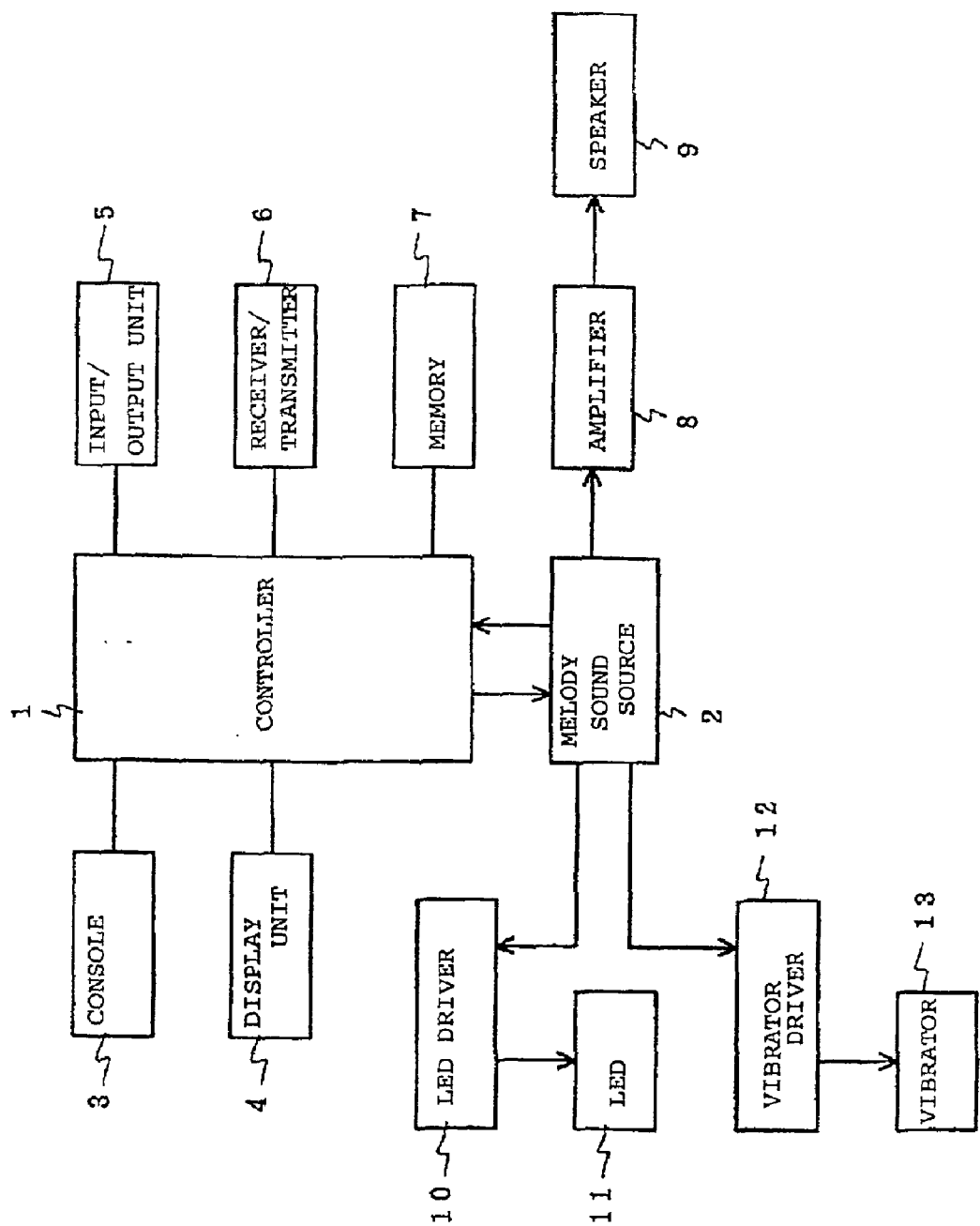
FIG. 1 is a block diagram of a mobile communication terminal according to a first embodiment of the present invention.

Referring now to FIG. 1, there is shown a mobile communication terminal according to a first embodiment of the present invention, which has a melody playing function to simultaneously produce the sounds of a plurality of sound parts and control the display of data based on melody data.

The mobile communication terminal comprises controller 1, melody sound source 2, console 3, display unit 4, input/output unit 5, receiver/transmitter 6, memory 7, amplifier 8, speaker 9, LED (Light-Emitting Diode) driver 10, LED 11, vibrator driver 12, and vibrator 13.

Controller 1 controls operation of the various components of the mobile communication terminal. Melody sound source 2 generates and outputs audio waveforms of melodies. Console 3 receives control actions entered by the user into the mobile communication terminal. Display unit 4 displays states of the mobile communication terminal and necessary information. Input/output unit 5 inputs and outputs ordinary voice sounds. Receiver/transmitter 6 receives and transmits radio communication signals. Memory 7 stores general saved information and setting information of the mobile communication terminal, information representing tones and intensities of sound parts for playing melodies, and melody data representing timings to produce sounds, notes and lengths of sounds, etc. LED 11 emits light in response to a preset action. Vibrator 13 vibrates a casing (not shown) of the mobile communication terminal in response to a preset action.

The mobile communication terminal may produce melody sounds to indicate an incoming call upon the arrival of the incoming call or may produce melody sounds in response to an action from the user.

For producing melody sounds, controller 1 reads melody data for producing melody sounds on melody sound source 2 from memory 7, and outputs the melody data to melody sound source 2. Then, melody sound source 2 generates and outputs the waveform of a melody, which is amplified by amplifier B and output as sounds from speaker 9.

At the same time that the melody is played, melody sound source 2 outputs an LED drive signal to LED driver 10, which energizes LED 11 to emit light. Melody sound source 2 also outputs a vibrator drive signal to vibrator driver 12, which actuates vibrator 13 to vibrate the casing.

Figure 2:
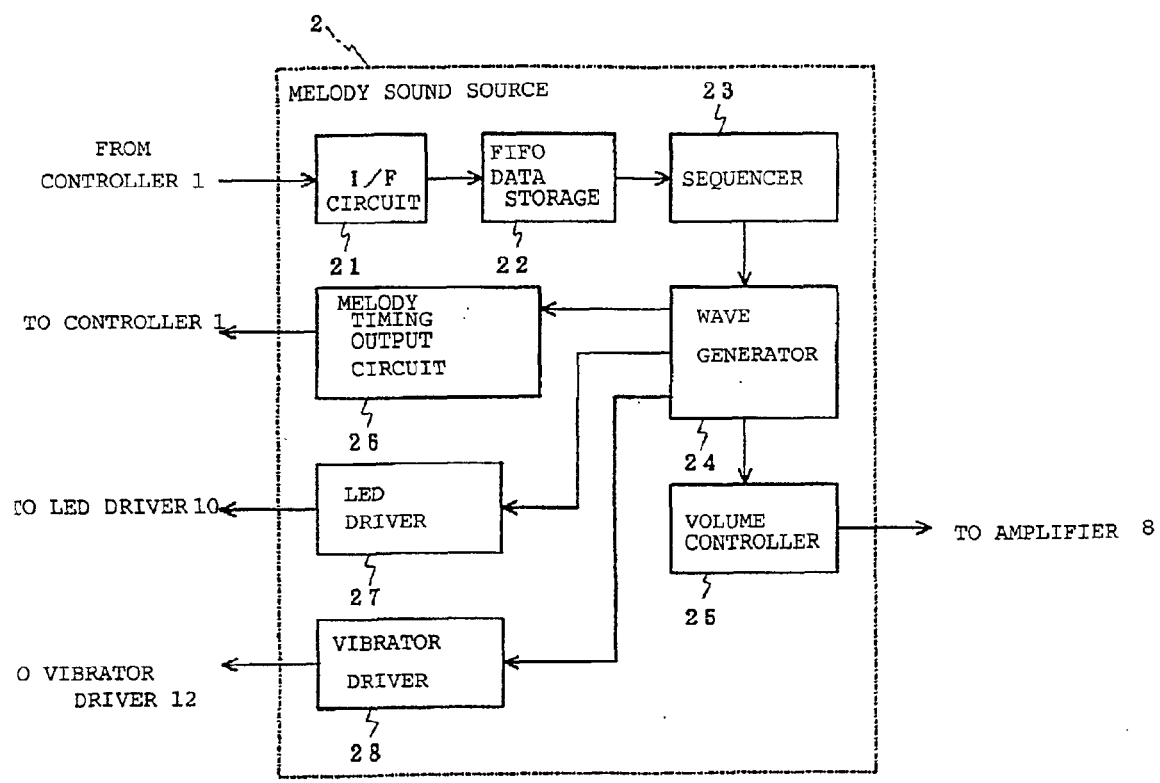
FIG. 2 is a block diagram of a melody sound source of the mobile communication terminal shown in FIG. 1.

FIG. 2 shows in block form melody sound source 2. As shown in FIG. 2, melody sound source 2 comprises I/F (InterFace) circuit 21, FIFO (First-In First-Out) data storage 22, sequencer 23, waveform generator 24, volume controller 25, melody timing output circuit 26, LED driver 27, and vibrator driver 28.

When a melody is to be played, I/F circuit 21 is supplied with information of tones and intensities of parts of the melody, timings to produce sounds of the parts, and notes and lengths of the sounds, etc. from controller 1. In the present embodiment, melody data are output from I/F circuit 21 through FIFO data storage 22 to sequencer 23 in order to reduce the processing by controller 1.

Sequencer 23 converts melody data into control signals of the parts for waveform generator 24 to control waveform generator 24. Waveform generator 24 generates a waveform with tones and intensities based on the melody data for each of the parts, and outputs the waveforms to volume controller 25. Volume controller 25 adjusts the volume of an audio output representing a combination of the waveforms of the parts that are generated by waveform generator 24, and outputs the audio output to amplifier 8.

Melody timing output circuit 26 outputs control signals that determine the timings of the sounds of the parts, which control signals correspond to the control signals of the parts that are output from sequencer 23 to waveform generator 24. Controller 1 has analyzed the melody data of the parts and determined contents to be displayed. In response to the control signals that determine the timings of the sounds of the parts from melody timing output circuit 26, controller 1 controls display unit 4 to display the contents to be displayed.

LED driver 27 outputs signals that determine the timings of the sounds of the parts, which signals correspond to the control signals of the sounds of the parts that are output from sequencer 23, to LED driver 10, making it possible to energize LED 11 in synchronism with the melody.

Vibrator driver 28 outputs signals that determine the timings of the sounds of the parts, which signals correspond to the control signals of the sounds of the parts that are output from sequencer 23, to vibrator driver 12, making it possible to actuate vibrator 13 in synchronism with the melody.

Figure 3:
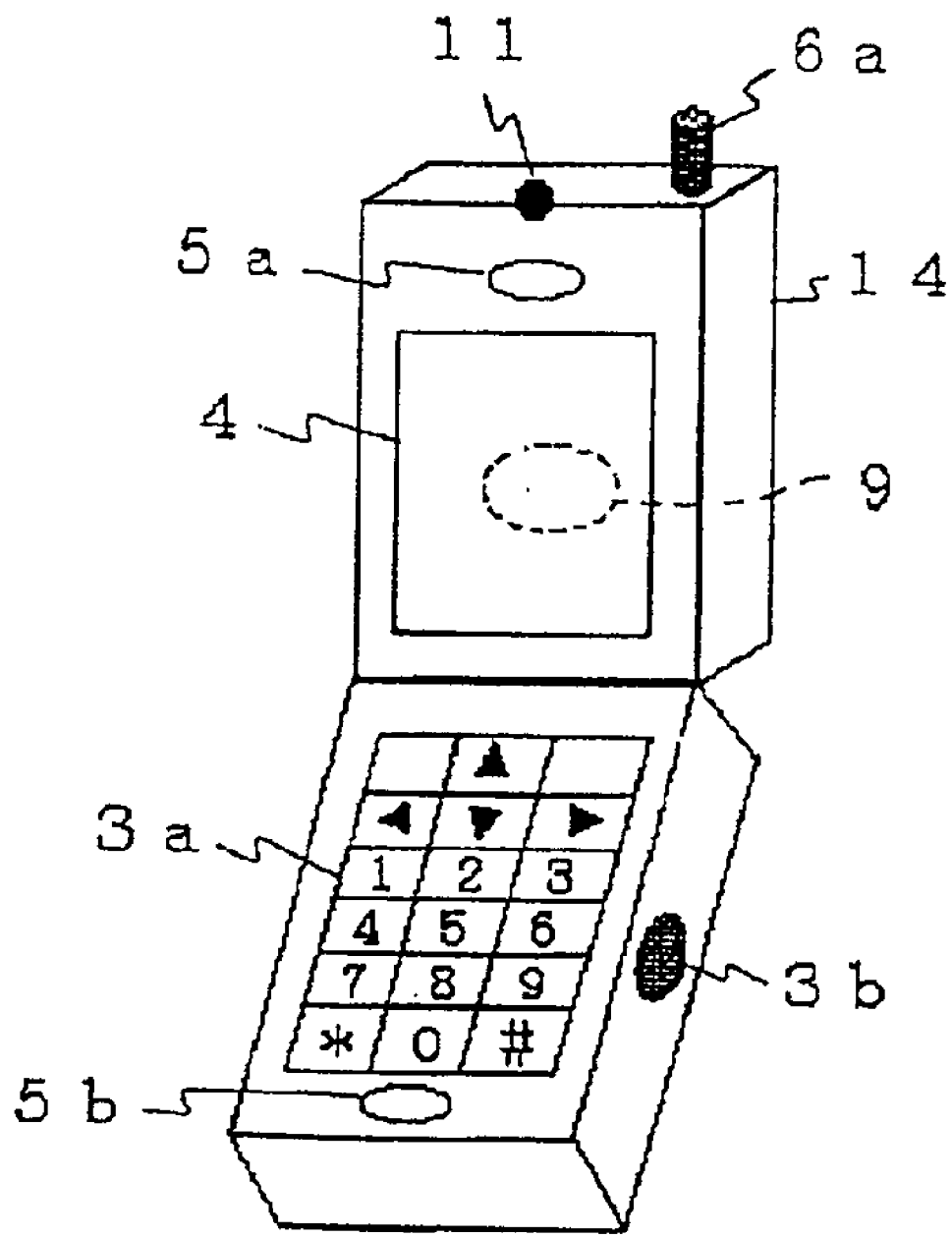
FIG. 3 is a perspective view of the mobile communication terminal according to the first embodiment of the present invention.

FIG. 3 shows in perspective the mobile communication terminal. In FIG. 3, the mobile communication terminal has foldable casing 14. The user usually carries the mobile communication terminal with casing 14 folded, and opens casing 14 to use the mobile communication terminal to communicate with other people or display data. The mobile communication terminal has antenna 6 a mounted on an upper end of casing 14. Antenna 6 a receives a radio wave, which is converted by receiver/transmitter 6 into a high-frequency signal that is supplied to a reception circuit (not shown), and radiates a high-frequency signal output from a transmission circuit (not shown) as a radio wave.

Casing 14 has console 3 and display unit 4 shown in FIG. 1 and also receiver 5a and microphone 5b on its front face. Receiver 5a is applied to an ear of the user and outputs received voice sounds from input/output unit 5 shown in FIG. 1 upon speech communication. Microphone 5b receives voice of the user and outputs voice sounds to be transmitted to input/output unit 5 shown in FIG. 1 upon speech communication. Console 3 has its major portion 3a, including switches, mounted on one of the foldable arms of casing 14 where microphone 5b is installed. Some switches 3b are mounted on a side of casing 14 so as to be operable when casing 14 is folded.

Speaker 9 for generating sounds when a melody is played is disposed on the back side of casing 14. LED 11 capable of emitting light in synchronism with melodies as they are played is disposed in a highly visually recognizable position on the front face of casing 14.

Figure 4:
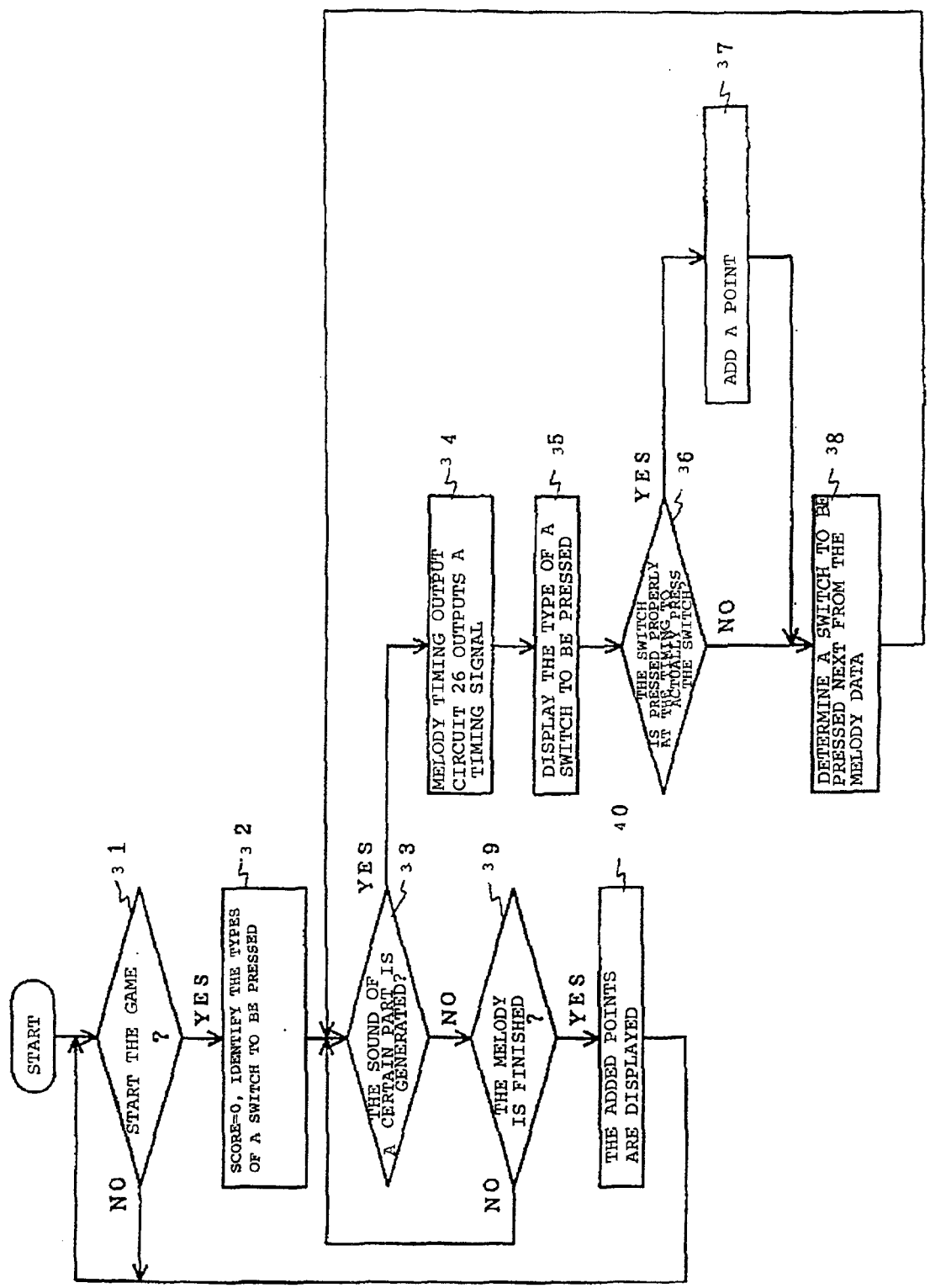
FIG. 4 is a flowchart of an operation sequence of a display control process of the mobile communication terminal according to the first embodiment of the present invention.

A process of controlling the display of data on the mobile communication terminal will be described below with reference to FIG. 4. A game will be described below as an example of an operation to control the display of data in synchronism with the sounds of a melody.

When the mobile communication terminal is connected to the Internet, the user of the mobile communication terminal can download desired melody data into the mobile communication terminal with a digital signal that can be received by receiver/transmitter 6, and save the downloaded melody data into memory 7. The game will be played using the melody data stored in memory 7.

The mobile communication terminal produces sounds based on the melody data. Depending on the contents and progress of the melody, the user presses switches on casing 14 to add a point of the game. The contents and progress of the melody serve to prompt the user to press the switches on the major portion 3a depending on the rhythm and the timings of the sounds of certain part of the melody. To let the user know, in advance, which switch is to be pressed to get a point, display unit 4 displays a switch to be pressed a certain time before the timing to press the switch.

The user listens to the melody that is played and sees the switch to be pressed a certain time later which is displayed on display unit 4, and then presses the switch rhythmically. The user repeats this cycle of operation to compete for points within a given time. It is therefore necessary for display unit 4 to display a switch to be pressed a certain time before the timing to press the switch, in synchronism with the melody. According to the present embodiment, the melody data of a certain part represent a sound intensity of 0, allowing melody timing output circuit 26 to generate a timing signal. Therefore, melody timing output circuit 26 outputs a timing signal to controller 1 at a timing which is a certain time before the timing to actually press the switch.

Controller 1 analyzes the melody data of a certain part in advance, determines a switch to be pressed at a next timing, and controls display unit 4 with the timing signal output from melody timing output circuit 26 to display the switch to be pressed. Consequently, the timing to generate the sounds of the melody data of the certain part is set at a certain time earlier than the timing to press the switch. When the corresponding switch is pressed at the timing after the elapse of the certain time, a point is added in favor of the user.

In step 31, if the user operates console 3 to make an action to start the game, then a melody starts being played and the game is started. When the game is started with the score=0, controller 1 reads melody data from memory 7, outputs the melody data to melody sound source 2 for playing a melody, analyzes the melody data of a certain part, and identifies the type of a switch to be pressed at the next timing from the note information accompanying sound production control data of the melody data, in step 32.

The type of a switch to be pressed may be identified from sound length information, for example, rather than note information, of the melody data. Since which switch is to be pressed at which timing is determined by the melody data of a certain part, the switch is intentionally determined in advance in view of the correlation to the rhythm of the melody and the level of difficulty of the game at a timing that is a given time prior to the timing to actually press the switch when the melody data is generated.

If the melody is played and the sound of a certain part starts being generated at a certain timing in step 33, then melody timing output circuit 26 outputs a timing signal in step 34. In step 35, controller 1 controls display unit 4 to display the type of a switch to be pressed in accordance with the timing signal.

After elapse of a certain time, controller 1 determines whether the switch is pressed properly at the timing to actually press the switch or not in step 36. If the switch is pressed properly at the timing, then a point is added in step 37. Controller 1 determines whether the switch is pressed properly at the timing or not by determining whether the switch is pressed within a certain time period extending across the accurate timing to press the switch.

If the switch is pressed after the timing to press the switch, then controller 1 determines the type of a switch to be pressed at a next timing in step 38. Thereafter, control returns to step 33. If the sound of a certain part starts being generated in step 33, then control goes to step 34 again. The type of a switch to be pressed next may be determined from a list of switches, including first through last switches, that are identified and temporarily stored by analyzing the melody data at the start of the game.

If the melody is finished in step 39, then the game is over. The performance of the melody is finished and the added points are displayed in step 40. Thereafter, control returns to step 31, leaving it to the user to decide whether to start the game again or not.

Figure 5:
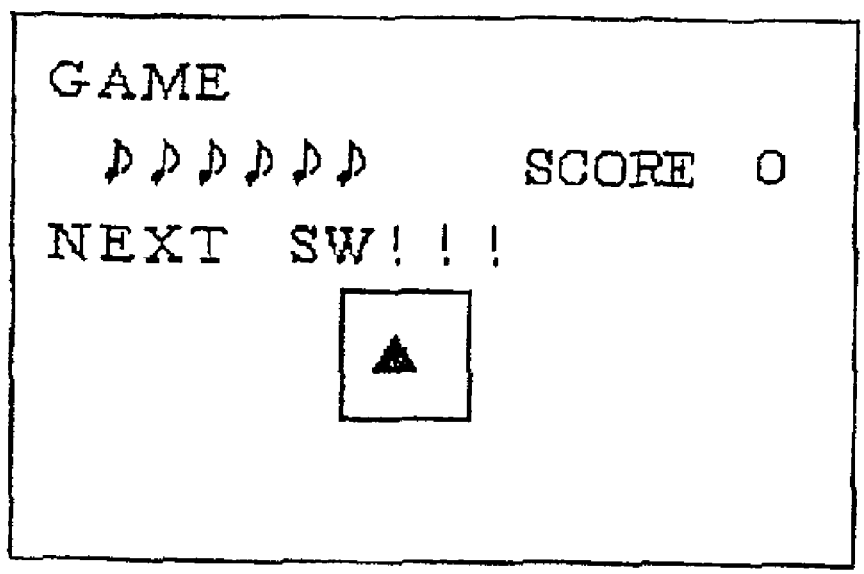
FIGS. 5a and 5b are views showing displayed images.
Figure 5:
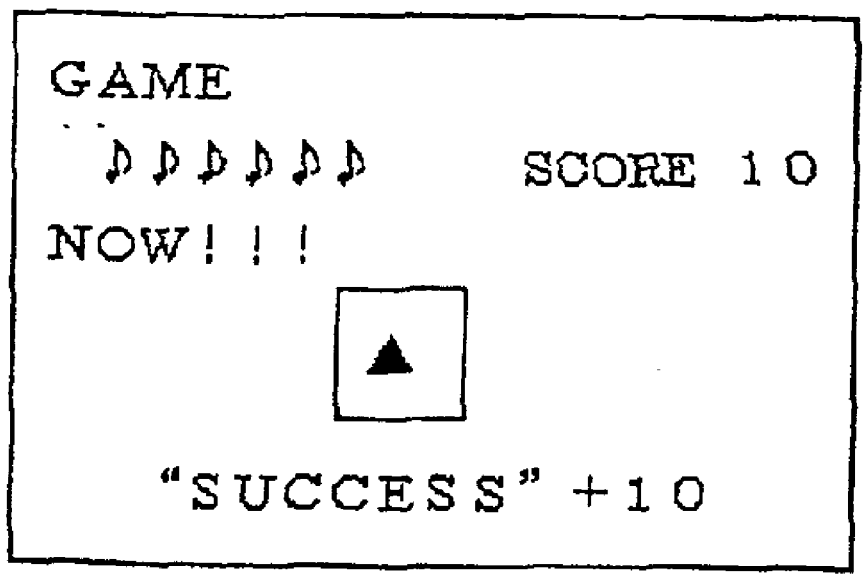

FIGS. 5a and 5b show examples of displayed images. FIG. 5a shows a displayed image in step 35 shown in FIG. 4, and FIG. 5b shows a displayed image in step 37 shown in FIG. 4.

Table 1 shows an association between melody data and display control contents in the present embodiment. As shown in Table 1, melody data (note information) "Do", "Re", "Mi", "Fa", "Sol", "La", "Si", "Do" (one octave higher), "Do #", "Re #", "Fa #" are associated respectively with display control contents (the types of switches to be pressed) "↑", "→", "↓", "←", "↑+↓ (simultaneous pressing)", "↑+→ (simultaneous pressing)", "↑+← (simultaneous pressing)", "↑+* (simultaneous pressing)", "→+↓ (simultaneous pressing)", "→+← (simultaneous pressing)", "↑+← (simultaneous pressing)".

TABLE 1

| Melody data (note information) | Display control contents (the types of switches to be pressed) |
| --- | --- |
| Do | ↑ |
| Re | → |
| Mi | ↓ |
| Fa | ← |
| Sol | ↑ + ↓ (simultaneous pressing) |
| La | ↑ + → (simultaneous pressing) |
| Si | ↑ + ← (simultaneous pressing) |
| Do (one octave higher) | ↑ + * (simultaneous pressing) |
| Do # | → + ↓ (simultaneous pressing) |
| Re # | → + ← (simultaneous pressing) |
| Fa # | ↑ + ← (simultaneous pressing) |

FIG. 6 shows a melody data format used in the present embodiment. According to the melody data format shown in FIG. 6, the number of parts is N and the number of sound generation events is M.

According to the melody format, a tone and a sound intensity are defined for each part, and parts, the timing to produce sounds, notes, and sound lengths are defined for each sound generation event. Specifically, the melody data format comprises "tone information of the first part", "sound intensity information of the first part", . . . , "tone information of the Nth part", "sound intensity information of the Nth part, "sound generation control (start) time (timing), sound part of the first sound", "tone information of the above sound", "sound length information of the above sound, . . . , "sound generation control (start) time (timing), sound part of the Mth sound", "tone information of the above sound", "sound length information of the above sound, and "data end information".

By displaying contents totally different from the notes or sound lengths of the melody in synchronism with the melody data, it is possible to obtain display information different from the melody data in synchronism with the melody using the conventional melody data capable of generating the sounds of a plurality of parts.

With the display information associated with the sound source control information, display information contained in melody data can be processed in strict synchronism with the sound source, and the melody data is associated with the display information to allow the melody data format to be used as it is in performing the above function.

Figure 7:
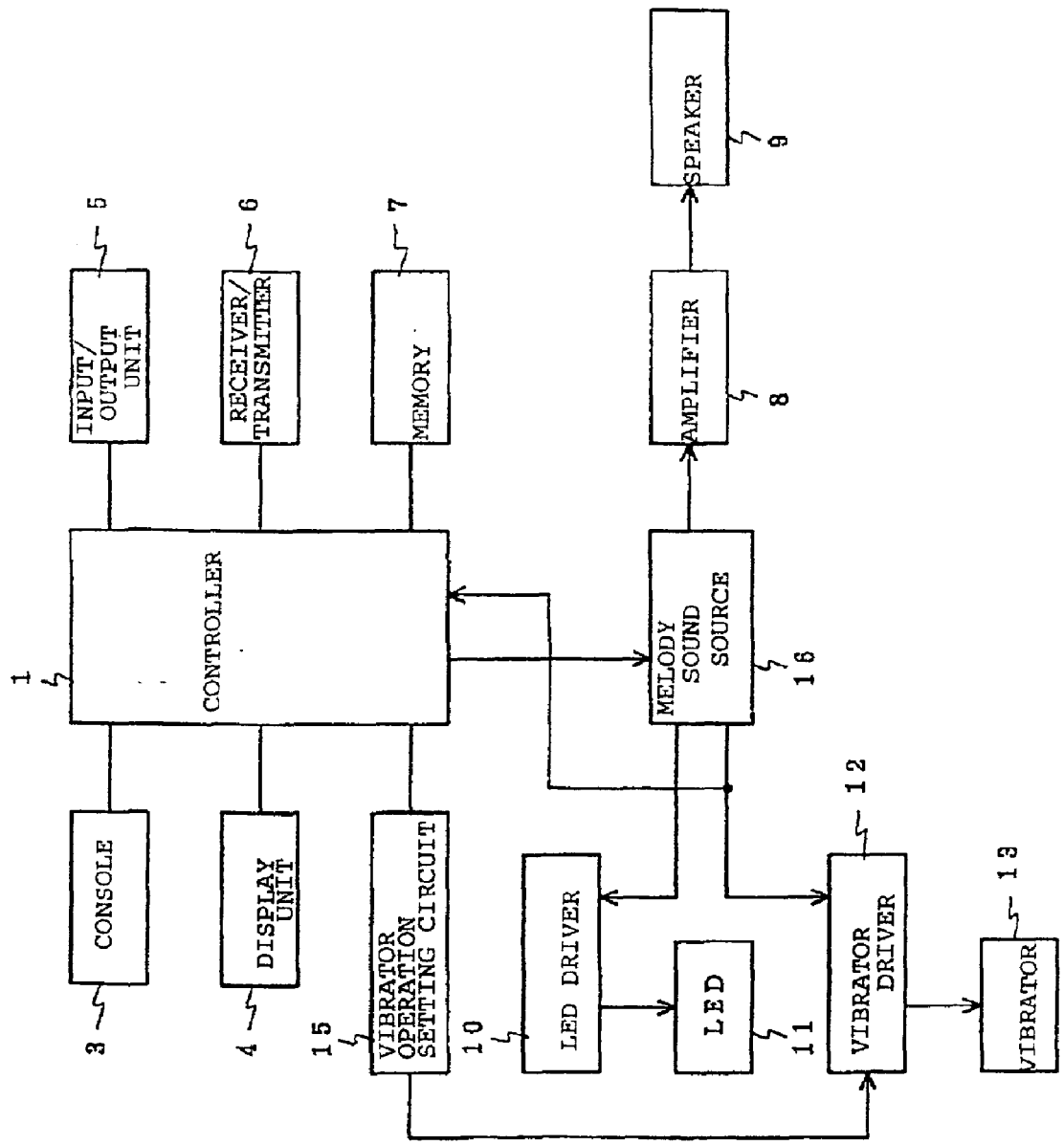
FIG. 7 is a block diagram of a mobile communication terminal according to a second embodiment of the present invention.

FIG. 7 shows in block form a mobile communication terminal according to a second embodiment of the present invention. The mobile communication terminal according to the second embodiment is identical to the mobile communication terminal according to the first embodiment except that a vibrator drive signal is used as a display control signal. Those parts of the mobile communication terminal according to the second embodiment which are identical to those of the mobile communication terminal according to the first embodiment are denoted by identical reference characters.

In the first embodiment, melody timing output circuit 26 is arranged to output separate timing signals to energize the LED and to actuate the driver, respectively, in synchronism with the sound source control process. In the second embodiment, a vibrator drive signal is used as a display control signal in order to simplify the hardware arrangement.

Specifically, a drive signal for vibrator driver 12, rather than a signal from melody timing output circuit 26, is output to controller 1. To prevent vibrator 13 from being actuated by the display control signal, the mobile communication terminal has a vibrator operation setting circuit 15 for limiting the actuation of vibrator 13.

Figure 8:
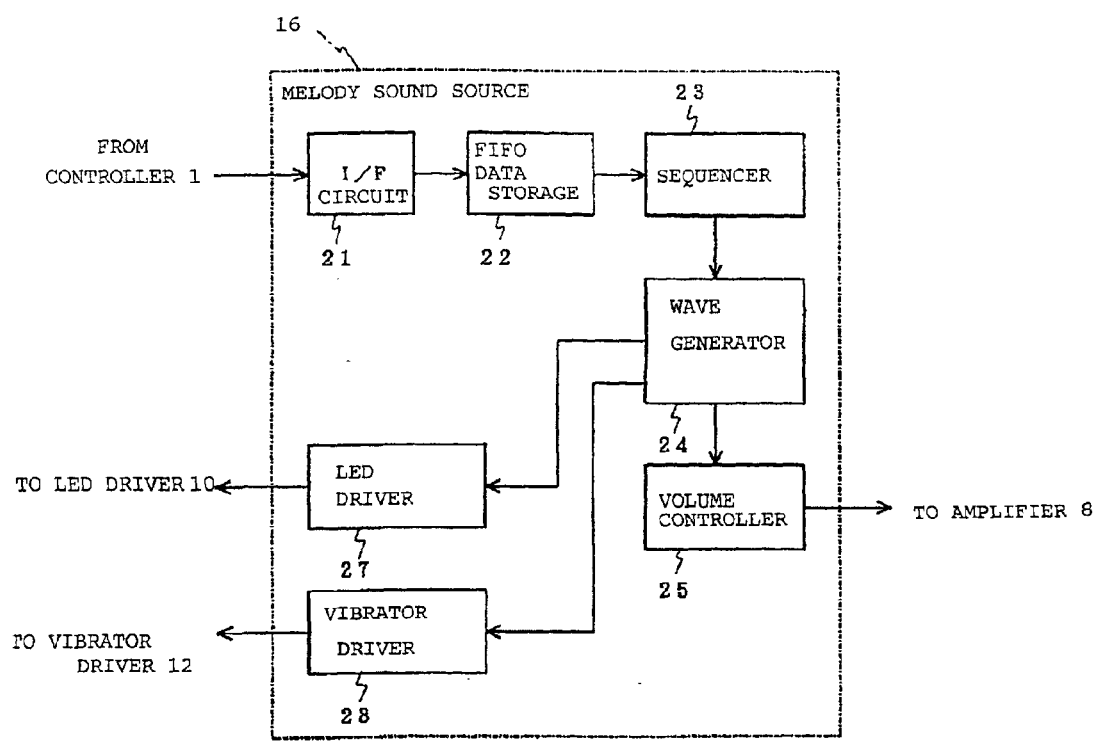
FIG. 8 is a block diagram of a melody sound source of the mobile communication terminal shown in FIG. 7.

FIG. 8 shows in block form melody sound source 16 shown in FIG. 7. Melody sound source 16 shown in FIG. 8 is identical to melody sound source 2 shown in FIG. 2 except that melody timing output circuit 26 is dispensed with. Those parts of melody sound source 16 shown in FIG. 8 which are identical to melody sound source 2 shown in FIG. 2 are denoted by identical reference characters.

Figure 9:
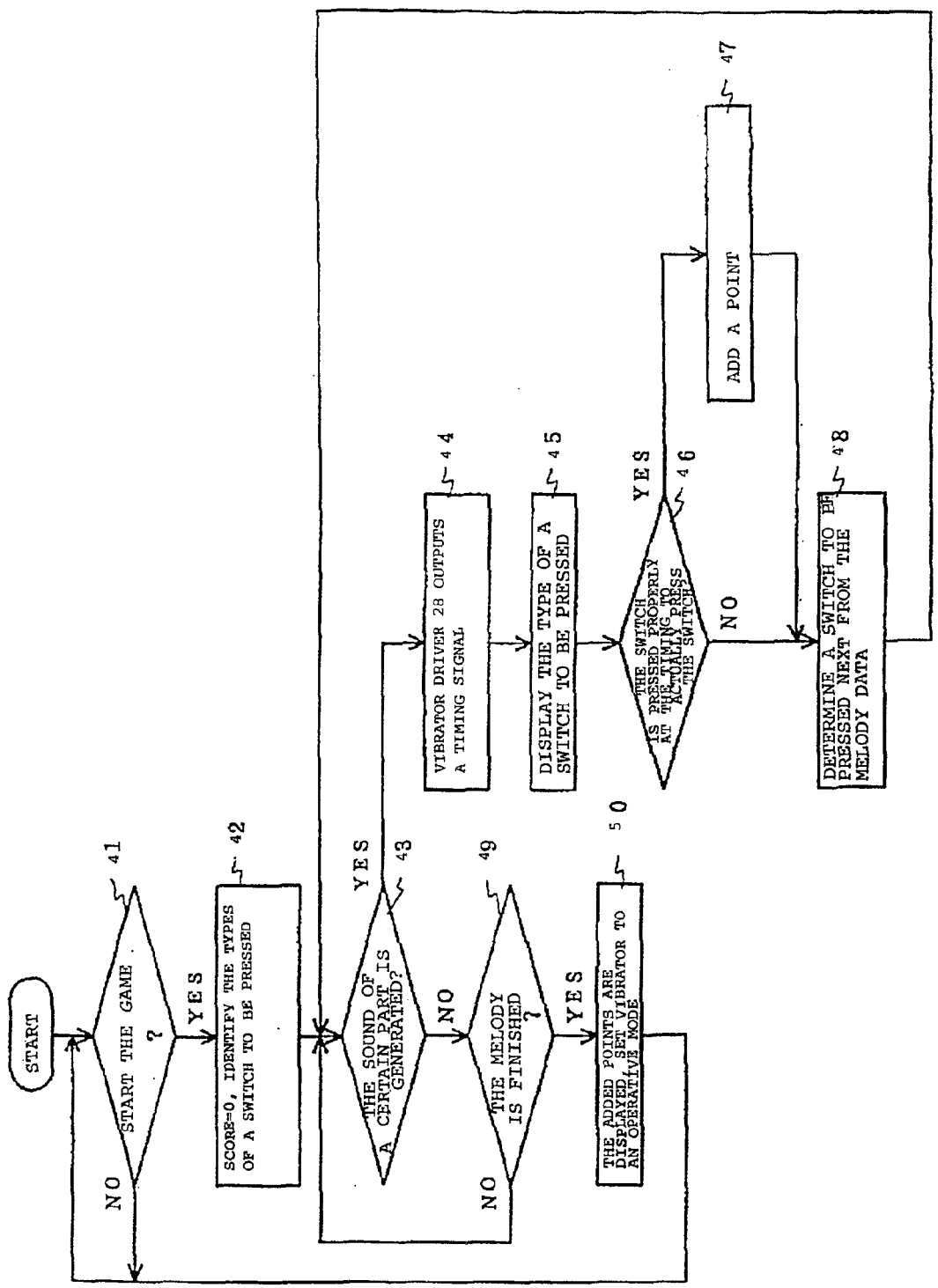
FIG. 9 is a flowchart of an operation sequence of a display control process of the mobile communication terminal according to the second embodiment of the present invention.

A display control process of the mobile communication terminal according to the second embodiment will be described below with reference to FIG. 9.

In step 41, if the user operates console 3 to make an action to start the game, then a melody starts being played and the game is started. When the game is started with the score =0, controller 1 reads melody data from memory 7, outputs the melody data to melody sound source 2 for playing a melody, analyzes the melody data of a certain part, and identifies the type of a switch to be pressed at a next timing from note information accompanying sound production control data of the melody data, in step 42. At this time, vibrator operation setting circuit 15 sets vibrator 13 to an inoperative mode, preventing vibrator 13 from being operated in a display control process.

The type of a switch to be pressed may be identified from sound length information, for example, rather than note information, of the melody data. Since which switch is to be pressed at which timing is determined by the melody data of a certain part, the switch is intentionally determined in advance in view of the correlation to the rhythm of the melody and the level of difficulty of the game at a timing that is a given time prior to the timing to actually press the switch when the melody data is generated.

If the melody is played and the sound of a certain part starts being generated at a certain timing in step 43, then vibrator driver 28 outputs a timing signal in step 44. In step 45, controller 1 controls display unit 4 to display the type of a switch to be pressed in accordance with the timing signal.

After elapse of a certain time, controller 1 determines whether the switch is pressed properly at the timing to actually press the switch or not in step 46. If the switch is pressed properly at the timing, then a point is added in step 47. Controller 1 determines whether the switch is pressed properly at the timing or not by determining whether the switch is pressed within a certain time period extending across the accurate timing to press the switch.

If the switch is pressed after the timing to press the switch, then controller 1 determines the type of a switch to be pressed at a next timing in step 48. Thereafter, control returns to step 43. If the sound of a certain part starts being generated in step 43, then control goes to step 44 again. The type of a switch to be pressed next may be determined from a list of switches up to the last switch, that are identified and temporarily stored by analyzing the melody data at the start of the game.

If the melody is finished in step 49, then the game is over. The performance of the melody is finished and the added points are displayed in step 50. At this time, vibrator operation setting circuit 15 sets vibrator 13 to an operative mode. Thereafter, control returns to step 41, leaving it to the user to decide whether to start the game again or not.

In the above display control process, when the game is started, the vibrator operation setting circuit 15 sets vibrator 13 to an inoperative mode, preventing vibrator 13 from being operated by a display control signal. Vibrator driver 28, rather than melody timing output circuit 26 shown in FIG. 2, outputs a timing signal.

When the game is over, vibrator driver 12 is capable of actuating the vibrator normally. A certain part of melody data for display control is a part to which the vibrator control process is assigned.

The second embodiment is advantageous in that since a signal for actuating the vibrator is used as a display control signal, melody sound source 16 is made simpler in arrangement than melody sound source 2 according to the first embodiment.

While the display control process is applied to a game in the above embodiments, it is not limited to a game but is also applicable to a process for controlling the display of character strings and images.

While preferred embodiments of the present invention have been described using specific terms, such description is for illustrative purposes only, and it is to be understood that changes and variations may be made without departing from the spirit or scope of the following claims.

What is claimed is:

1. A mobile communication terminal comprising:
   melody playing means for simultaneously producing sounds of a plurality of sound parts of melody data responsive to note information and sound length information;
   a vibrator for vibrating a casing in response to a preset action;
   a light-emitting diode for emitting light in response to a preset action;
   output means for generating and outputting a timing signal to produce sounds of a given part of said melody data; and
   control means for performing a display control process in synchronism with said timing signal from said output means and performing a display control process on information other than said note information or sound length information associated with said note information or sound length information, said display control process accompanying the sounds of said melody data, said display control process displaying said information other than said note information or sound length information in association with said producing sounds in accordance with said note information or said sound length information.

2. A mobile communication terminal according to claim 1, further comprising:
   means for eliminating intensity of the sounds of said given part.

3. A mobile communication terminal according to claim 1, wherein said output means comprises
   means for outputting said timing signal separately from a signal to actuate said vibrator and a signal to energize said light-emitting diode.

4. A mobile communication terminal according to claim 2, wherein said output means comprises
   means for outputting said timing signal separately from a signal to actuate said vibrator and a signal to energize said light-emitting diode.

5. A mobile communication terminal comprising:

melody playing means for simultaneously producing the sounds of a plurality of sound parts of melody data;

a vibrator for vibrating a casing in response to a preset action;

a light-emitting diode for emitting light in response to a preset action;

output means for generating and outputting a signal to actuate said vibrator according to a given part of said melody data; and control means for performing a display control process in synchronism with said signal to drive said vibrator from said output means and performing a display control process on information other than note information or sound length information associated with said note information or sound length information, said display control process accompanying sounds corresponding to said melody data in association with said note information or said sound length information.

6. A mobile communication terminal according to claim 5, further comprising:

means for making said vibrator inoperative when said control means performs the display control processes.

7. A mobile communication terminal according to claim 1, further comprising means for providing said note information or sound length information in association with display control contents information other than said note information of sound length information.

8. A mobile communication terminal according to claim 5, further comprising means for providing said note information or sound length information in association with display control contents information other than said note information of sound length information.

* * * * *